United States Patent
Korenshtein

(12) 
(10) Patent No.: US 6,523,134 B2
(45) Date of Patent: *Feb. 18, 2003

(54) SELECTIVE UNDO

(75) Inventor: Roni Korenshtein, Los Gatos, CA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/156,771

(22) Filed: Sep. 18, 1998

(65) Prior Publication Data

US 2002/0049926 A1 Apr. 25, 2002

(51) Int. Cl.[7] .............................................. G06F 13/00
(52) U.S. Cl. .............................. 714/16; 714/9; 707/531
(58) Field of Search ...................... 714/19, 16; 707/531

(56) References Cited

U.S. PATENT DOCUMENTS

| | | | |
|---|---|---|---|
| 5,408,328 A | | 4/1995 | Boliek et al. ............ 358/261.4 |
| 5,530,864 A | * | 6/1996 | Matheny et al. ............ 395/700 |
| 5,537,526 A | | 7/1996 | Anderson et al. ............ 395/148 |
| 5,659,747 A | * | 8/1997 | Nakajima .................... 395/651 |
| 5,692,184 A | * | 11/1997 | Ardoin et al. |
| 6,052,691 A | * | 4/2000 | Ardoin et al. ............... 707/102 |
| 6,111,575 A | * | 8/2000 | Martinez et al. ............ 345/352 |
| 6,167,455 A | * | 12/2000 | Friedman et al. ........... 709/320 |
| 6,185,591 B1 | * | 2/2001 | Baker et al. ................. 707/531 |
| 2001/0049704 A1 | * | 12/2001 | Hamburg et al. ............ 707/530 |

* cited by examiner

*Primary Examiner*—Norman M. Wright
(74) *Attorney, Agent, or Firm*—Gates & Cooper LLP

(57) ABSTRACT

A "Selective Undo Function" for computer programs allows a user to select any single specific action that was previously recorded by the computer, and undo only that selected action, rather than every action that chronologically follows the specific action. Specifically, the computer program may undo just the selected action, even if the selected action is not the last action taken by the user, if that is possible; or the computer program may perform some analysis and undo other actions that are deemed prerequisites to undoing the selected action, upon user confirmation; or if the analysis performed by the computer program cannot determine what these prerequisites are or cannot perform the undo function, then the computer program may take a default action, e.g., undo the selected action as well as all actions that follow the selected action, in chronological order.

30 Claims, 5 Drawing Sheets

SELECTIVE UNDO

BACKGROUND OF THE INVENTION

1. Field of the Invention

This invention relates generally to computer systems, and in particular to a selective undo function for a computer program.

2. Description of Related Art

In most computer programs, there is often a need to modify documents, files, classes, objects, attributes, object properties, etc. Current methods for performing modifications are not necessarily error-free, and often need to be undone. What is needed, then, is a straightforward method for capturing information concerning the modifications, so that the modifications can be undone if necessary.

Undo functions exist in many computer programs. Some Undo functions allow the user to undo just the last action taken by the user. Other Undo functions allow the user to continually undo the last actions, in a LIFO (Last-In First-Out) manner, i.e., the last change made by the user is "undone" first. So the user can undo the last action, and then the action just before the last, etc.

In the prior art, Undo functions have been implemented in a number of different ways:

- A simple selection of an undo action/menu item, which can be done repeatedly by the user.
- Some sort of a dial or status indicator is shown to the user, where the user can click on scroll-bar-like buttons pointing right/left to set the amount of actions that needs to be undone and that whole set of actions is undone when the user clicks on the OK button.
- A mechanism where a textual description of each action is shown in some LIFO stack and when the user selects one of these actions, it, and all the actions that took place later in chronological order, are all undone.

Thus, there is a need in the art for an improved Undo function. Specifically, there is a need in the art for an Undo function that allows the user to select any single specific action in a history/log of previous actions, and undo that action only, rather than including every action that followed it.

SUMMARY OF THE INVENTION

To overcome the limitations in the prior art described above, and to overcome other limitations that will become apparent upon reading and understanding the present specification, the present invention discloses a method, apparatus, and article of manufacture for performing a "Selective Undo Function" for computer programs, wherein the function allows a user to select any single specific action that was previously recorded by the computer, and undo only that selected action, rather than every action that chronologically follows the specific action. Specifically, the computer program may undo just the selected action, even if the selected action is not the last action taken by the user, if that is possible; or the computer program may perform some analysis and undo other actions that are deemed prerequisites to undoing the selected action, upon user confirmation; or if the analysis performed by the computer program cannot determine what these prerequisites are or cannot perform the undo function, then the computer program may take a default action, e.g., undo the selected action as well as all actions that follow the selected action, in chronological order.

However, for a better understanding of the invention and its advantages, reference should be made to the drawings which form a further part hereof, and to accompanying descriptive matter, in which there is illustrated and described specific examples in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Hardware Environment

Figure 1:
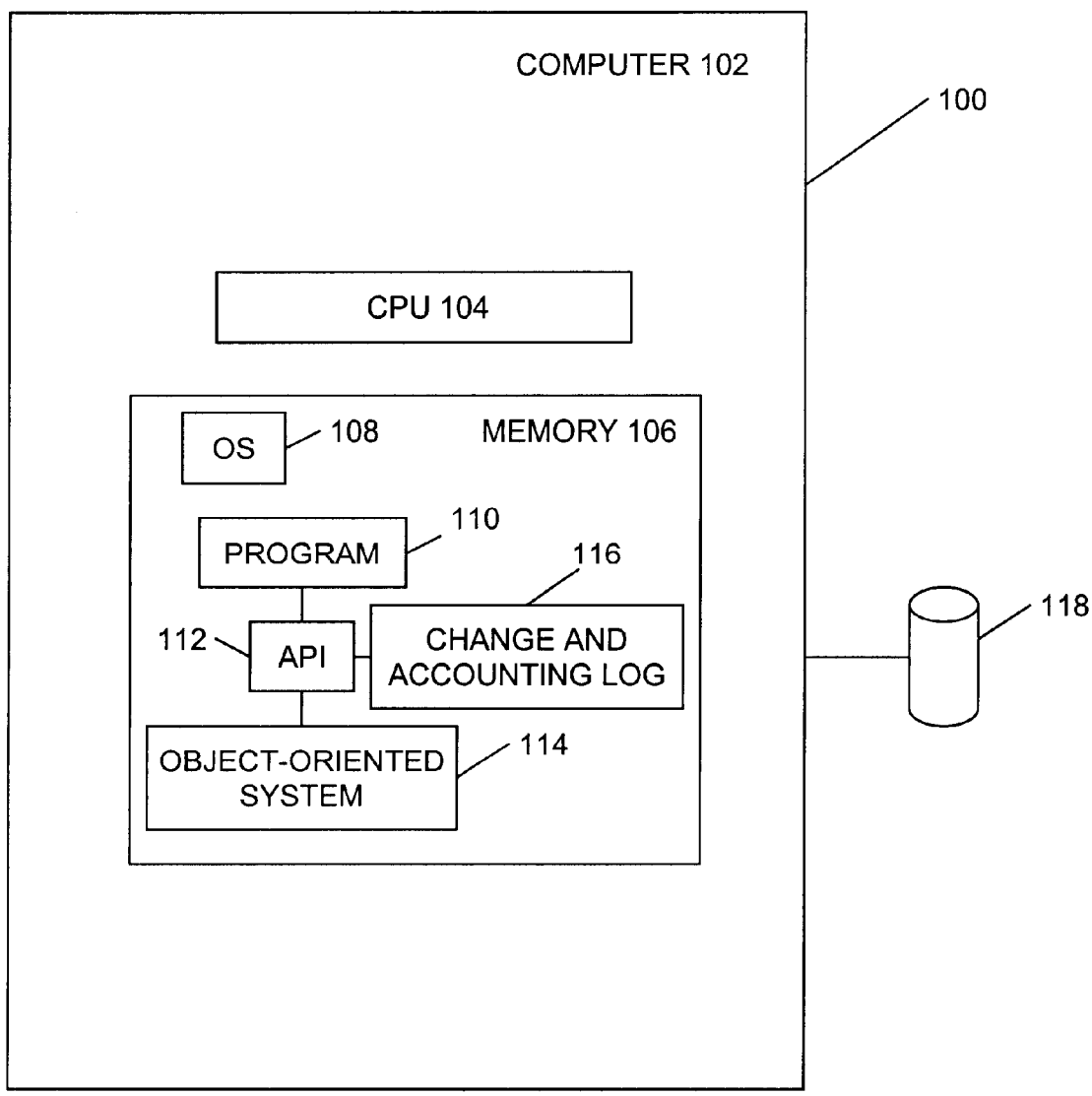
FIG. 1 illustrates an exemplary computer system that could be used to implement the present invention.

FIG. 1 illustrates an exemplary computer system 100 that could be used to implement the preferred embodiment of the present invention. The computer 102 comprises a processor 104 and random access memory (RAM) 106. The computer 102 may be coupled to other devices, such as a monitor, a keyboard, a mouse device, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106. The preferred embodiment of the present invention is implemented using one or more object-oriented computer programs or applications 110, an application programming interface (API) 112, an object-oriented system 114, and/or a change and accounting log 116. The computer program 110 accesses and manipulates an object-oriented system 114 using the functions provided by the API 112. The object-oriented system 114 may include one or more models, which are groupings of classes and objects. As the object-oriented system 114 is changed, the API 112 creates.the change and accounting log 116 documenting all such changes made to the object-oriented system 114, for later review or perusal.

Generally, these instructions and/or data 108–116 are all tangibly embodied in or retrievable from a computer-readable device, medium, or carrier, e.g., a memory, a data storage device, a remote device coupled to the computer via a data communications device, etc. Moreover, these instructions and/or data, when read, executed, and/or interpreted by the computer 102, causes the computer 102 to perform the steps necessary to implement and/or use the preferred embodiment of the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data embodied in any device, medium, or carrier.

Of course, those skilled in the art will recognize many modifications may be made to this configuration without departing from the scope of the present invention. Those skilled in the art will also recognize that any combination of the above components, or any number of different components, including computer programs, peripherals, and other devices, may be used to implement the present invention, so long as similar functions are performed thereby.

Synchronizing the Object-Oriented System

Figure 2:
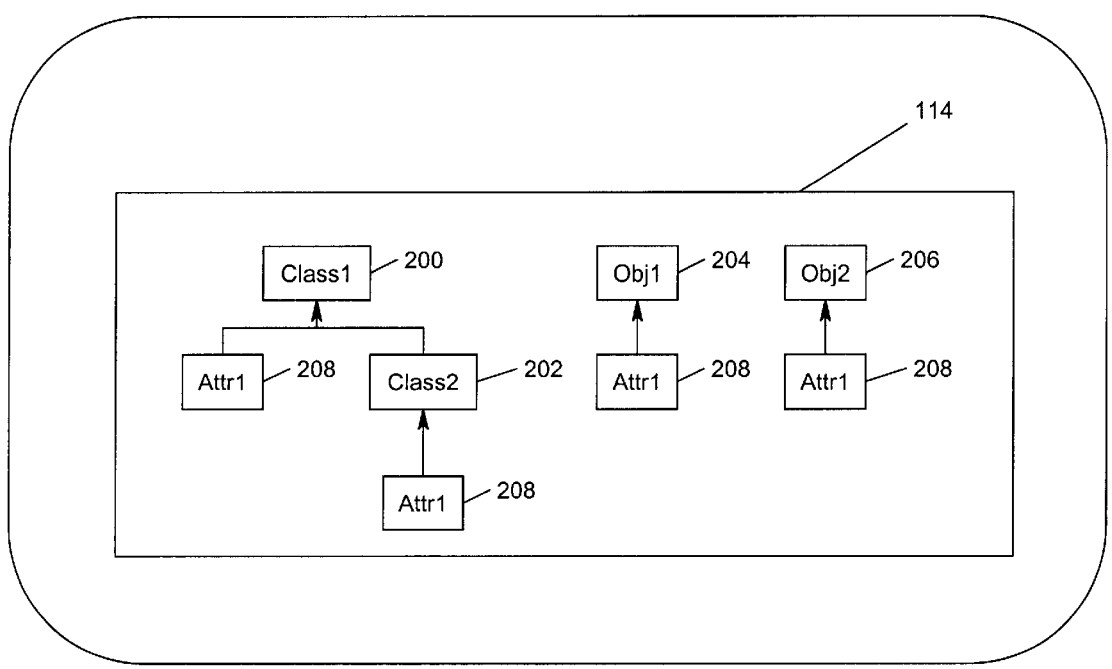
FIG. 2 is a block diagram illustrating the structure of an exemplary object-oriented system according to the present invention.

FIG. 2 is a block diagram illustrating the structure of an exemplary object-oriented system 114 according to the preferred embodiment of the present invention. In the object-oriented system 114, Class2 202 is a subclass of Class1 200. Object1 (Obj1) 204 is an instance of Class1 200 and Object2 (Obj2) 206 is an instance of Class2 202.

Class1 200 and Class2 202 both include Attribute1 (Attr1) 208. Attr1 208 is propagated to Obj1 204, which is an instance of Class1 200. Attr1 208 is also propagated to Obj2 206, which is an instance of Class2 202. The attributes are identified as Class1/Attr1, Class2/Attr1, Obj1/Attr1, and Obj2/Attr1.

In order to change Attr1, for example, Class1 200, Obj1 204, Class2 202, and Obj2 206 must be updated, so that they remain synchronized. The computer program 110, using the API 112, performs this update in three steps: Step 1 generates a list of the classes and objects having the attribute, Step 2 checks all the classes and objects on the list to be sure they can be changed, and Step 3 performs the desired change to the attribute in the listed classes and objects.

In Step 1, the computer program 110 and API 112 determine the targets which will be synchronized by the method. This step traverses the object-oriented system 114 and, using navigation functions, identifies the classes, objects, attributes, etc., for update and records the names of these identified entities in a list.

In Step 2, the computer program 110 proceeds through the list, checking whether the operation would cause local conflicts with each identified class, object, attribute, etc. A user interface optionally queries the user at this step. If all classes, objects, attributes, etc., return an affirmative indication, then the method proceeds to Step 3.

In Step 3, the computer program 110 updates the target classes and objects by calling an API 112 command function for each class and object from the list to change the attribute. After this step, synchronization is complete.

Application Program Interface (API)

The API 112 provides the necessary functions for the computer program 110 to make changes to the classes, objects, attributes, etc., across the object-oriented system 114 as illustrated in FIG. 2. The API 112 also provides the necessary functions for creating a change and accounting log 116 documenting these changes.

API Navigation Functions

The API 112 navigation functions are performed using the following relationships: (1) in a defining entity, from an object to a class and from a subclass to a superclass; (2) in a defined entity, from a class to an object and a superclass to a subclass; (3) in an owner, from a sub-entity to a class or object, where the sub-entity is an attribute, event, etc.; (4) in an owned entity, from a class or object to a sub-entity; and (5) in related attributes, from an attribute to another attribute via a relation.

The following describes some of the specific API 112 navigation functions invoked by the computer program 110.

The function GetDefiningEntity identifies the class which is the definition template for an entity. For classes, this function returns the top of the inheritance tree.

The function GetDefiningClass returns the defining class.

The function ListDefinedEntities lists the classes in the defining class.

The function ListDefinedEntitiesWithObject lists the entities in the defining class.

The function ListSubClasses recursively lists all subclasses of the current class.

The function ListSubClassesWithObject lists all subclasses and entities of the current class.

The function ListInstances lists all instances of the current class. For objects, this function lists all instances of the GetDefiningEntity function.

The function ListInstancesRecursively lists all instances of the current class and its subclasses.

The function GetOwner returns the object container for objects and sub-entities. For classes, this function returns the superclass. This function returns "self", if at a top-level class or object, or there are no superclasses.

The function ListOwnedEntities lists all owned entities of the current class.

The function ListRelatedEntities lists all related entities of the current class.

API Command Functions

The API 112 command functions provide the mechanism for the computer program 110 to modify classes and objects in the object-oriented system 114. The API 112 command functions are a higher level interface that use the API 112 navigation functions. The following describes some of the specific API 112 command functions invoked by the computer program 110 to manipulate the object-oriented system 114.

The GET function retrieves the value of a property of one or more classes, objects, attributes, etc. The input sequence has the name of the class, object, attribute, etc., to get information about, the type of data to retrieve, and the scope of the data.

The CHECK function determines whether an operation should be performed.

In essence, the CHECK function allows a user to determine what changes to the object-oriented system 114 would occur if an API 112 command function such as SET, ADD, or DELETE were invoked. However, the changes are not actually made to the object-oriented system 114, but are reported through the output parameters. If the user invoked the actual API 112 command function after invoking the CHECK function, the output parameters would be identical, but the object-oriented system 114 would be altered.

The SET function specifies values for properties of classes, objects, attributes, etc. The input sequence has three parameters: the name of the entity to be modified, the property of the entity that is to be modified, and the new value for the property.

The ADD function creates a class, object, attribute, etc., for embedding or connecting to an existing class, object, attribute, etc. The input sequence has the name of the entity, the type of entity to add, the name of the entity to add, and the instance destination.

The DELETE function removes an entity from the object-oriented system 114.

Additional functions provided by the API 112 include instantiation and subclassing. These functions are built on the primary synchronization capabilities, wherein the instantiation function copies classes to objects and the subclassing function adds or removes inherited objects from the superclass.

Computer Program Operation

A number of examples are provided below to further illustrate the operation of the computer program 110 according to the preferred embodiment of the present invention. These examples include the computer program 110 invoking API 112 command functions SET, ADD, and DELETE on the object-oriented system 114 of FIG. 2.

Update Example

In a first example, suppose the type of Obj1/Attr1 needs to be changed. This requires that all the attributes are updated to a new type so that they remain synchronized. The present invention performs this update in three steps: Step 1 forms a list of the attributes, Step 2 checks all the attributes on the list to be sure they may have their type changed, and Step 3 performs the update on the listed attributes.

Step 1 identifies the objects to change using a series of API 112 navigation functions. The procedure is to find a root defining class, its subclasses, their instances, and then the attribute of the preceding set of classes and objects.

The API 112 navigation function GetOwner("Obj1/Attr1") returns "Obj1", the owner of the attribute. The relationship between Attr1 and Obj1 is available as a relative path name "./Attr1" using the GetRelativeName( ) function. The root defining class is then found by the GetDefiningEntity("Obj1") function, which returns "Class 1" as the top of the inheritance hierarchy.

The subclasses of Class1 are identified by the ListSubClasses( ) function. The full list of classes and subclasses is ("Class1", "Class2"). For each element, its instances are listed, the net effect being the function ListInstancesRecursively( ), which returns ("Obj1", "Obj2"). The full set of entities is now ("Class1", "Class2", "Obj1", "Obj2").

The list of target attributes to update are now available by adding the relative path name "./Attr1" to the list above, resulting in ("Class1/Attr1", "Class2/Attr1", "Obj1/Attr1", "Obj2/Attr1"), completing the identification of the entities to update.

Step 2 performs the checking by iterating through the listed targets defined by Step 1, and calling the CHECK function on each target from the list. If all objects return an affirmative indication, then the method proceeds to Step 3.

Step 3 updates the target objects by calling the SET function on each target from the list. This completes the synchronization.

Add Example

To add an attribute "Attr2" to Class1 or Obj1, the list of targets is determined in Step 1 ("Class1", "Class2", "Obj1", "Obj2"). The API 112 navigation functions used are GetDefiningEntity( ) followed by ListInstancesRecursively( ).

Step 2 calls the CHECK function for each target of the list from Step 1 to verify the ability to add a new attribute.

Step 3 adds the attribute by invoking the ADD function for each target of the list, thereby completing the synchronization.

Delete Example

To delete the attribute "Attr1" from Class1 or Obj1, the list of targets is determined in Step 1 ("Class1", "Class2", "Obj1", "Obj2"). The API 112 navigation functions used are GetDefiningEntity( ) followed by ListInstancesRecursively( ).

Step 2 calls the CHECK function for each target of the list from Step 1 to verify the ability to delete the attribute.

Step 3 removes the attribute by invoking the DELETE function for each target of the list, thereby completing the synchronization.

Change and Accounting Log Entries

Figure 3:
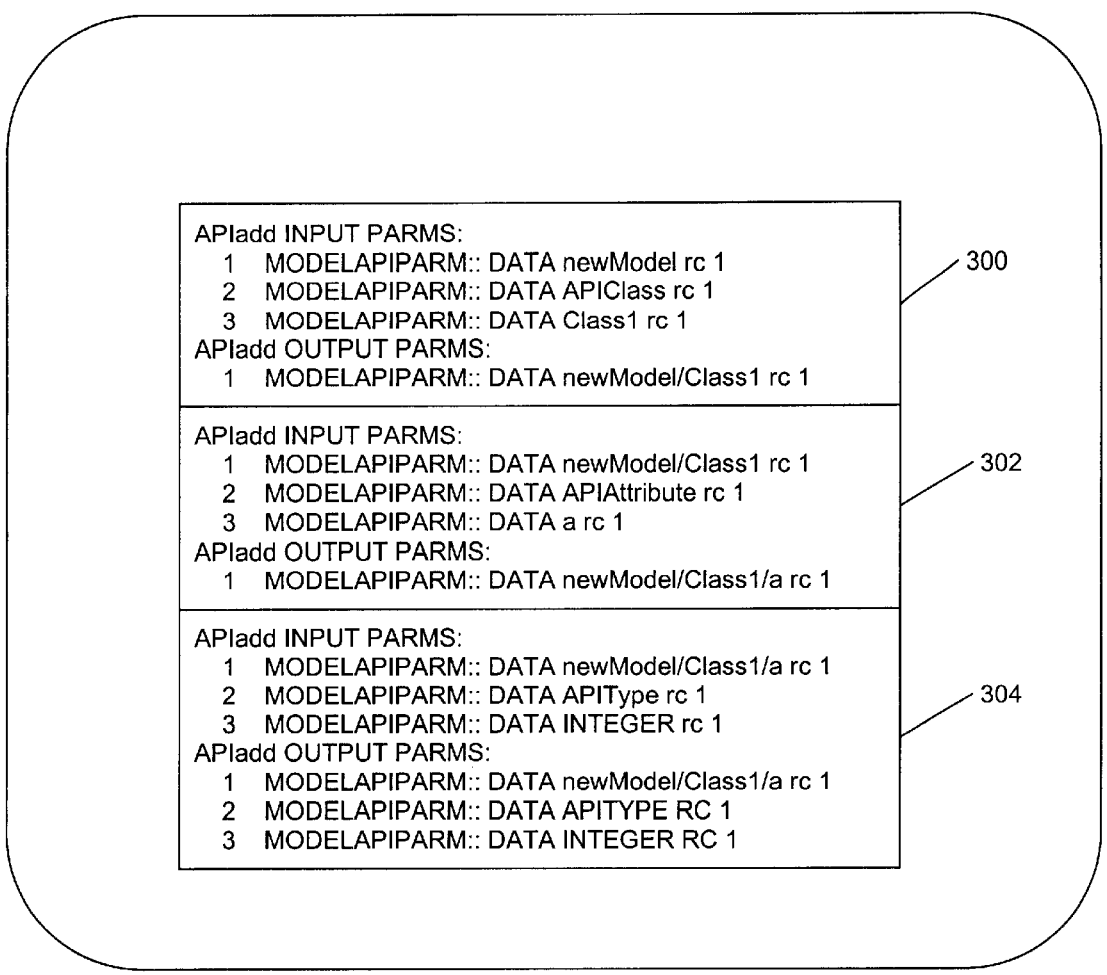
FIG. 3 is a block diagram illustrating the contents of a change and accounting log created by the present invention.

FIG. 3 includes examples of the entries of a change and accounting log 116 created by the preferred embodiment of the present invention. In the present invention, the API 112 records all changes made to the object-oriented system 114 in the change and accounting log 116, including all additions, deletions, and modifications. It also records all requests for information.

Each action made in the object-oriented system 114 may be recorded in the log 116 by the API 112. For example, if a class or attribute is added to, modified in, or deleted from the object-oriented system 114, or an attribute is added to a class, or a change is made to the type of attribute, etc., then the API 112 makes an entry in the log 116 for each action.

An entry 300 is written to the log 116 by the API 112 when "Class1" is added to the object-oriented system 114. The first line includes "APIadd" that identifies that the ADD function in the API 112 was invoked and is a header for the following input parameters. The second, third and fourth lines identify the input parameters passed to the APIadd function, wherein "newModel" on line 2 indicates that the APIadd function is being performed on the model named "newModel", "APIClass" on line 3 indicates that the APIadd function is adding a new class "Class1" to model "newModel", and "Class1" on line 4 indicates that the new class is named "Class1". The fifth line also includes "APIadd" that identifies that the ADD function in the API 112 was invoked and is a header for the following output parameter. The sixth line identifies the output parameter received from the APIadd function, wherein "newModel/Class1" indicates that the APIadd function added a new class to the model. The "rc" on each of lines 2–4 and 6 are return codes from the ADD function (1 means success and 0 means failure).

An entry 302 is written to the log 116 by the API 112 when attribute "a" is added to "Class1" in the object-oriented system 114. The first line includes "APIadd" that identifies that the ADD function in the API 112 was invoked and is a header for the following input parameters. The second, third and fourth lines identify the input parameters passed to the APIadd function, wherein "newModel/Class1" on line 2 indicates that the APIadd function is being performed on class "Class1" in model "newModel", "APIAttribute" on line 3 indicates that the APIadd function is adding a new attribute to class "Class1" in model "newModel", and "a" on line 4 indicates that the new attribute is named "a". The fifth line also includes "APIadd" that identifies that the ADD function in the API 112 was invoked and is a header for the following output parameter. The sixth line identifies the output parameter received from the APIadd function, wherein "newModel/Class1/a" indicates that the APIadd function added a new attribute "a" to class "Class1" of model "newModel". The "rc" on each of lines 2–4 and 6 are return codes from the ADD function (1 means success and 0 means failure).

An entry 304 is written to the log 116 by the API 112 when the type of attribute "a" is set in the object-oriented system 114. The first line includes "APIset" that identifies that the SET function in the API 112 was invoked and is a header for the following input parameters. The second, third and fourth lines identify the input parameters passed to the APIset function, wherein "newModel/Class1/a" on line 2 indicates that the APIset function is being performed on the attribute named "newModel/Class1/a", "APIType" on line 3 indicates that the APIset function is setting the type of the attribute "a" of class "Class1" in the "newModel" model, and "INTEGER" on line 4 indicates that the attribute "a" is being set to an integer type attribute. The fifth line also includes "APIset" that identifies that the SET function in the API 112 was invoked and is a header for the following output parameter. The sixth line identifies the output parameter received from the APIset function, wherein "newModel/Class1/a" indicates that the APIset function set the type of attribute "a" in class "Class1" of model "newModel". The seventh line also includes "APIset" that identifies that the SET function in the API 112 was invoked and is a header for the following output parameter. The eighth line identifies the output parameter received from the APIset function, wherein "newModel/Class1/a" indicates that the APIset function set the type of attribute "a" in class "Class1" of model "newModel". The "rc" on each of lines 2–4 and 6–8 are return codes from the SET function (1 means success and 0 means failure).

An alternative embodiment of the present invention includes a return code that provides specific error information, such as user id, user name, time, date, and process id in the log 116.

Operation of the Selective Undo Function

In the preferred embodiment of the present invention, a user may select any single specific action reflected in an entry in the change and accounting log 116, and undo only that selected action rather than every action that follows it in the log 116. Specifically, the user has the ability to:

1. have the computer program 110 undo just the selected action even if the selected action is not the last action taken by the user, if that is possible; or
2. have the computer program 110 perform some analysis and undo other actions that are deemed prerequisites to undoing the selected action, upon user confirmation; or
3. followed by both #1 or #2 above, if the analysis performed by the computer program 110 in #2 above cannot determine what these prerequisites are or cannot perform the undo function, then the computer program 110 may take a default action, which is to undo the selected action as well as undo all actions that follow the selected action, in chronological order.

The logic behind the need for such a selective undo function may be explained by the following scenario. Suppose the user, in chronological order, has the computer program 116 perform the following actions:

1. create Obj1,
2. add Attr1 to Obj1,
3. add Attr2 to Obj1,
4. create Obj2, and
5. perform other kinds of operations on Obj2.

If the user decides that the action in Step 2 needs to be undone, the user can select that action from the change and accounting log 116 displayed on the computer 102 and request that the computer program 110 undo the selected action. The prior art would undo the action in Steps 5, 4, 3, and 2. The present invention, in contrast, allows the user to undo only the action in Step 2.

The computer program 110 may perform a simple analysis to determine if the action can be done, i.e., whether Attr1 can be removed from Obj1, and then perform the undo function if it is possible; otherwise, the computer program 110 displays an error message on the computer 102. In this example, since Obj1 still exists in the model, it may be verified whether Attr1 may be removed, and it may in fact be removed, (the standard synchronization method described above, as if the user has selected to remove the attribute, which is the undoing of the adding of an attribute).

Suppose, however, that the user renames Attr1 in Obj1 to a3 in Step 6. If the user now requests to undo Step 2 above, Attr1 obviously cannot be removed from Obj1, since it is no longer there as Attr1.

The computer program 110 may perform the following steps. In one embodiment, the computer program 110 may determine that Attr1 was renamed to Attr3 in Step 6 and therefor conclude, rightly, that Step 6 must be undone first and then followed by Step 2. Following this analysis, the computer program 110 may display the log 116 containing these two actions, and prompt the user for a confirmation of the analysis, followed by the execution of the "undoing" of these two actions (i.e., renaming Attr3 to Attr1, and then removing Attr1).

In another embodiment, the analysis performed by the computer program 110 may, without looking at the log 116, simply determine what undo functions can be performed and prompt the user for a confirmation prior to performing the undo functions. For example, if the user requests that a deletion of an attribute al from Obj1 be undone at the time when Obj1 no longer exists, the analysis performed by the computer program 110 would simply conclude (without examining the log 116) that in order to fulfill this undo, Obj1 needs to be added followed by adding Attr1 back to Obj1.

Yet another embodiment may take a simpler approach that would notify the user that the requested undo function cannot be performed, and the computer program 110 would provide the user with the alternatives to either "cancel" the request or undo the action and everything that follows it in the log 116. In the latter case, the computer program 110 would perform the undo function for the Steps 6, 5, 4, 3, and 2.

Logic of Computer Program

Figure 4:
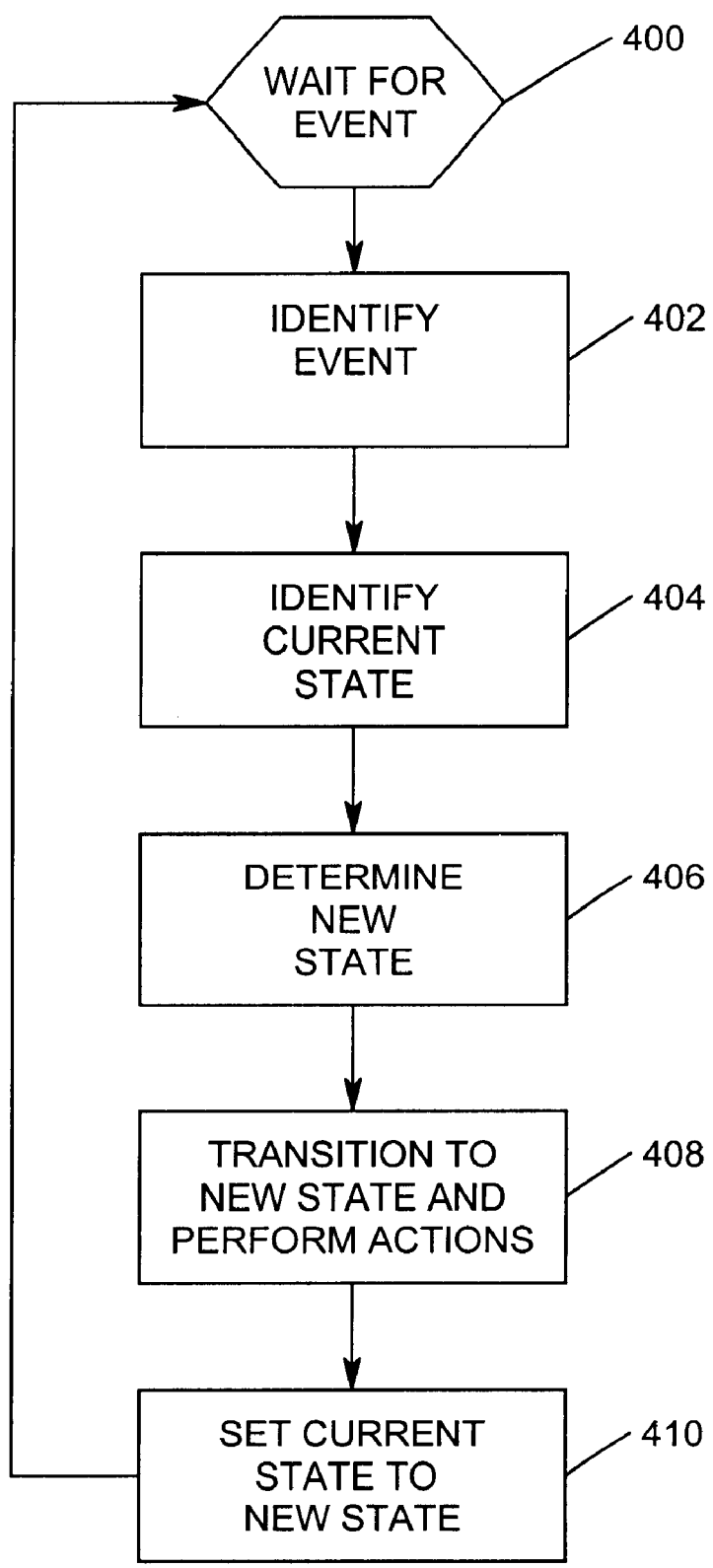
FIGS. 4 and 5 are flowcharts illustrating the operation of the present invention.

FIG. 4 is a flowchart that illustrates the general logic of a message or event-driven computer program 110 performing the steps of the present invention. In such a computer program 110, operations are performed when transitions are made, based upon the receipt of messages or events, from present or current states to new states.

Generally, the flowchart begins by waiting at block 400 for an event (e.g., a mouse button click, etc.). It should be appreciated that during this time, other tasks, e.g., file, memory, and video tasks, etc., may also be carried out by the computer 102. When an event occurs, control passes to block 402 to identify the event. Based upon the event, as well as the current state of the system determined in block 404, a new state is determined in block 406. In block 408, the logic transitions to the new state and performs any actions required for the transition. In block 410, the current state is set to the previously determined new state, and control returns to block 400 to wait for more input events.

The specific operations that are performed by block 408 when transitioning between states will vary depending upon the current state and the event. The various operations required to implement and maintain the preferred embodiment of the present invention represent particular events handled by the logic. However, it should be appreciated that these operations represent merely a subset of all of the events handled by the computer 102.

Figure 5:
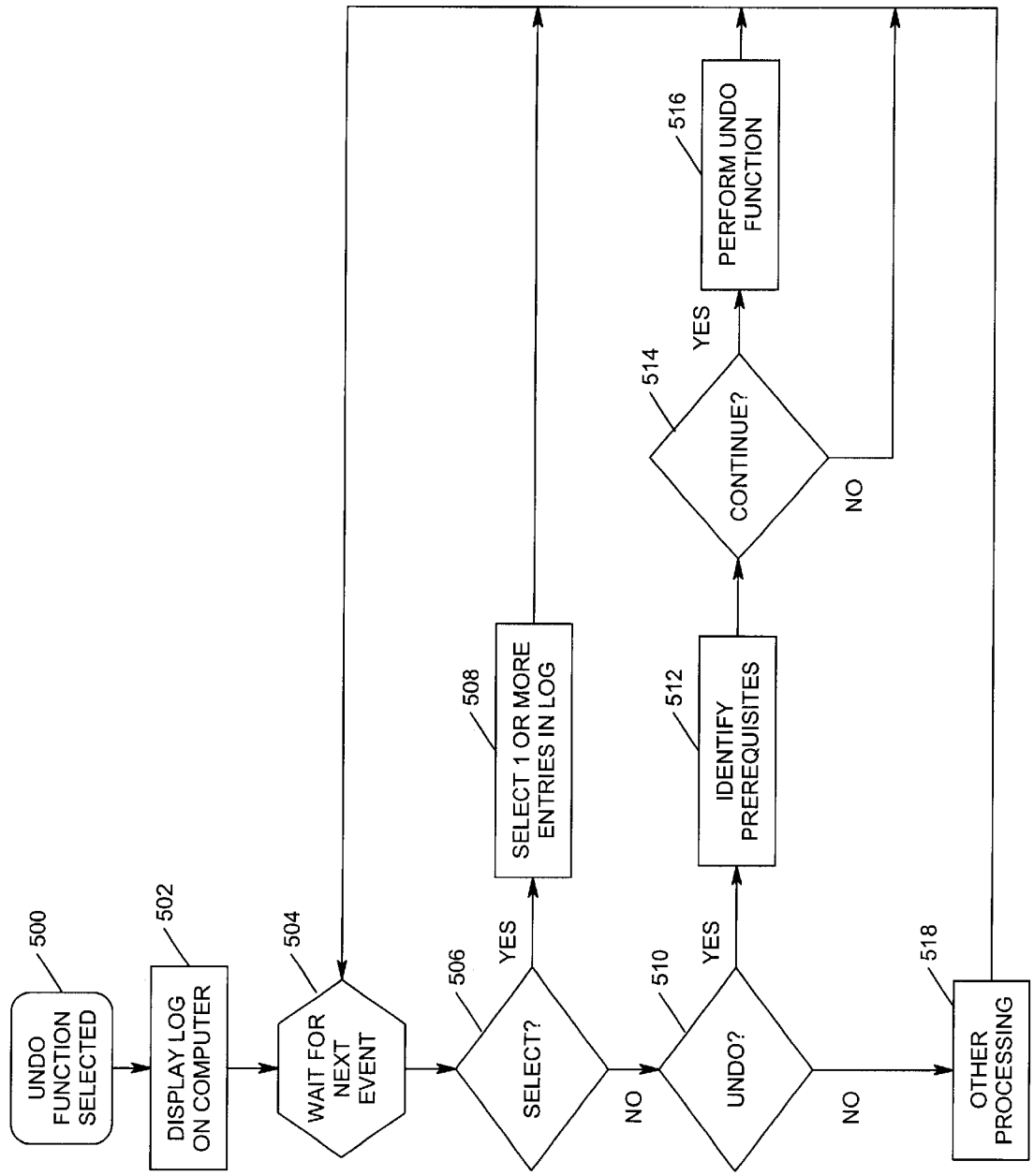

FIG. 5 is a flowchart showing the steps performed by the computer 102 for the undo function.

Block 500 represents the start of the undo function, which occurs when the user selects or otherwise invokes the function. The undo function may be invoked via keyboard commands, mouse commands, selection of menu items, or any number of other ways.

Block 502 represents the computer 102 displaying some or all of the change and accounting log 116. In one embodiment, the computer 102 analyzes the change and accounting log 116 and customizes the displayed based on that analysis. For example, one or more of the entries in the change and accounting log 116 may be displayed as a stack or other structure.

Blocks 504–518 together comprise a loop that represents the various operations of the computer 102 when performing the undo function. Specifically, Block 504 represents the computer 102 waiting for the next event to occur (e.g., user input via a keyboard, mouse, etc.).

Block 506 is a decision block that represents the computer 102 determining whether the event represents the user requesting the selection of one or more entries of the change and accounting log 116. If so, control transfers to Block 508; otherwise, control transfers to Block 510.

Block 508 represents the computer 102 selecting the desired entries of the change and accounting log 116, wherein a user may select any single specific action in the change and accounting log 116, and undo only that selected action, rather than every action that follows it in the log 116. Thereafter, control transfers to Block 604.

Block 510 is a decision block that represents the computer 102 determining whether the event represents the user requesting an undo function for the previously selected entries of the change and accounting log 116. If so, control transfers to Block 512; otherwise, control transfers to Block 518.

Block 512 represents the computer 102 performing an analysis of the entries of the log 116 to identify those actions that are deemed prerequisites to undoing the selected action. Following the analysis, the computer program 110 may prompt the user for a confirmation of the analysis. Thereafter, control transfers to Block 514.

Block 514 is a decision block that represents the computer 102 determining whether the identified prerequisites can be fulfilled. If the analysis performed by the computer program 110 cannot determine what these prerequisites are or cannot perform the undo function, then the computer program 110 may take a default action, such as displaying an error message. If so, control transfers to Block 516; otherwise, control transfers to Block 504.

Block 516 represents the computer 102 performing the undo function. Generally, the user is prompted for a confirmation prior to performing the undo functions. Thereafter, control transfers to Block 504.

Block 518 represents the computer 102 performing other processing functions. Thereafter, control transfers to Block 504.

Conclusion

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any number of different types of computer programs, including non-object-oriented as well as object-oriented programs, could benefit from the present invention. Any number of different types of user interfaces, selection mechanisms, function invocations, etc., could be used with the present invention. Finally, any number of different types of logs, stacks, or other data structures could be used with the present invention.

In summary, the present invention discloses a method, apparatus, article of manufacture for performing a "Selective Undo Function" for computer programs, wherein the function allows a user to select any single specific action that was previously recorded by the computer, and undo only that selected action, rather than every action that chronologically follows the specific action. Specifically, the computer program may undo just the selected action, even if the selected action is not the last action taken by the user, if that is possible; or the computer program may perform some analysis and undo other actions that are deemed prerequisites to undoing the selected action, upon user confirmation; or if the analysis performed by the computer program cannot determine what these prerequisites are or cannot perform the undo function, then the computer program may take a default action, e.g., undo the selected action as well as all actions that follow the selected action, in chronological order.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computerized method for performing a selective undo function in a computer, comprising the steps of:
   (a) selecting a single action from any of a plurality of actions previously performed by a computer and recorded in a log in the computer, wherein the selected action is not a last action recorded in the log; and
   (b) performing a selective undo function for the selected action , wherein the undo function is performed only for the selected action rather than every action that follows the selected action in the log.

2. The method of claim 1 above, further comprising the steps of a the log and identifying other actions recorded in the log that are prerequisites to performing the selective undo function for the selected action.

3. The method of claim 2 above, further comprising the step of performing the selective undo function for the identified other actions recorded in the log that are prerequisites to performing the selective undo function for the selected action.

4. The method of claim 3 above, further comprising the step of performing the selective undo function for the identified other actions recorded in the log upon user confirmation of the analyzing and identifying steps.

5. The method of claim 3 above, further comprising the step of performing a default action when the analyzing and identifying steps cannot determine what are the prerequisites.

6. The method of claim 5 above, wherein the default action comprises the step of performing the selective undo function on the selected action as well as all actions that follow the selected action in the log.

7. The method of claim 2 above, wherein the performing step comprises the step of performing the selective undo function on all of the actions that follow the selected action in chronological order.

8. The method of claim 1 above, further comprising the step of performing a default action when the performing step cannot perform the selective undo function.

9. The method of claim 8 above, wherein the default action comprises the step of displaying an error message on the computer.

10. The method of claim 1 above, further comprising the step of prompting the user for a confirmation before performing the selective undo function.

11. A computerized apparatus for performing a selective undo function in a computer, comprising:

a computer;

means, performed by the computer, for selecting a single action from any of a plurality of actions previously performed by a computer and recorded in a log in the computer, wherein the selected action is not a last action recorded in the log; and means, performed by the computer, for performing a selective undo function for the selected action, wherein the selective undo function is performed only for the selected action rather than every action that follows the selected action in the log.

12. The apparatus of claim 11 above, further comprising means for analyzing the log and for identifying other actions recorded in the log that are prerequisites to performing the selective undo function for the selected actions.

13. The apparatus of claim 12 above, further comprising means for performing the selective undo function for the identified other actions recorded in the log that are prerequisites to performing the selective undo function for the selected action.

14. The apparatus of claim 13 above, further comprising means for performing the selective undo function for the identified other actions recorded in the log upon user confirmation of the analyzing and identifying.

15. The apparatus of claim 12 above, further comprising means for performing a default action when the analyzing and identifying cannot determine what are the prerequisites.

16. The apparatus of claim 15 above, wherein the default action comprises means for performing the selective undo function on the selected action as well as all actions that follow the selected action in the log.

17. The apparatus of claim 16 above, wherein the means for performing comprises means for performing the selective undo function on all of the actions that follow the selected action in chronological order.

18. The apparatus of claim 11 above, further comprising means for performing a default action when the means for performing cannot perform the selective undo function.

19. The apparatus of claim 18 above, wherein the default action comprises means for displaying an error message on the computer.

20. The apparatus of claim 11 above, further comprising means for prompting the user for a confirmation before performing the selective undo function.

21. An article of manufacture embodying logic for performing a selective undo function in a computer, the logic comprising the steps of:

(a) selecting a single action from any of a plurality of actions performed by a computer and recorded in a log in the computer wherein the selected action is not a last action recorded in the log; and (b) performing a selective undo function for the selected action, wherein the undo function is performed only for the selected action rather than every action that follows the selected action in the log.

22. The method of claim 21 above, further comprising the steps of analyzing the log and identifying other actions recorded in the log that are prerequisites to perform the selective undo function for the selected action.

23. The method of claim 22 above, further comprising the step of performing the selective undo function for the identified other actions recorded in the log that are prerequisites to performing the selective undo function for the selected action.

24. The method of claim 23 above, further comprising the step of performing the selective undo function for the identified other actions recorded in the log upon user confirmation of the analyzing and identifying steps.

25. The method of claim 22 above, further comprising the step of performing a default action when the analyzing and identifying steps cannot determine what are the prerequisites.

26. The method of claim 25 above, wherein the default action comprises the step of performing the selective undo function on the selected action as well as all actions that follow the selected action in the log.

27. The method of claim 22 above, wherein the performing step comprises the step of performing the selective undo function on all of the actions that follow the selected action in chronological order.

28. The method of claim 21 above, further comprising the step of performing a default action when the performing step cannot perform the selective undo function.

29. The method of claim 28 above, wherein the default action comprises the step of displaying an error message on the computer.

30. The method of claim 21 above, further comprising the step of prompting the user for a confirmation before performing the selective undo function.

* * * * *

UNITED STATES PATENT AND TRADEMARK OFFICE
CERTIFICATE OF CORRECTION

PATENT NO.    : 6,523,134 B2
DATED         : February 18, 2003
INVENTOR(S)   : Roni Korenshtein It is certified that error appears in the above-identified patent and that said Letters Patent is hereby corrected as shown below:

Column 10,
Line 67, "a" should read -- analyzing --.

Signed and Sealed this

Nineteenth Day of August, 2003

JAMES E. ROGAN
*Director of the United States Patent and Trademark Office*